United States Patent [19]

Weigl

[11] Patent Number: 5,533,477
[45] Date of Patent: Jul. 9, 1996

[54] APPARATUS FOR ASCERTAINING AN OPERATING STATE OF AN INJECTION PUMP

[75] Inventor: Manfred Weigl, Berg, Germany

[73] Assignee: Siemens Aktiengesellschaft, Munich, Germany

[21] Appl. No.: 308,128

[22] Filed: Sep. 19, 1994

[30] Foreign Application Priority Data

Sep. 17, 1993 [DE] Germany ................... 93 115 072.6

[51] Int. Cl.⁶ ............................................. F02M 37/04
[52] U.S. Cl. ........................ 123/494; 123/506; 123/425; 73/119 A
[58] Field of Search .................... 123/506, 494, 123/425, 500, 501; 73/119.9

[56] References Cited

U.S. PATENT DOCUMENTS

| | | | |
|---|---|---|---|
| 4,331,117 | 5/1982 | Ginsburgh | 123/425 |
| 4,788,960 | 12/1988 | Oshizawa | 123/506 |
| 4,884,549 | 12/1989 | Kelly . | |
| 5,063,903 | 11/1991 | Wahl | 123/506 |
| 5,195,492 | 3/1993 | Gronenberg | 123/506 |
| 5,205,262 | 4/1993 | Anton | 123/494 |

FOREIGN PATENT DOCUMENTS 0481912  4/1992  European Pat. Off. .

OTHER PUBLICATIONS

Patent Abstracts of Japan, vol. 14583, Dec. 26, 1990 & JP-890071802 (DIESEL) Mar. 27, 1989.
Patent Abstracts of Japan, vol. 8165, Jul. 31, 1984; & JP-820173524 (FUJI) Oct. 1, 1982.
Patent Abstracts of Japan, vol. 12409, Oct. 28, 1988; & JP-860295866 (HONDA) Dec. 12, 1986.
Patent Abstracts of Japan, vol. 6083, May 21, 1982; & JP-800094428 (HITACHI) Jul. 9, 1980.
Patent Abstracts of Japan, vol. 7071, Mar. 24, 1983; & JP-810097045 (hitachi) Jun. 2, 1981.

Primary Examiner—Carl S. Miller
Attorney, Agent, or Firm—Herbert L. Lerner; Laurence A. Greenberg

[57] ABSTRACT

An internal combustion engine, in particular a Diesel engine, includes an injection pump with a filling ramp and a supply ramp of a cam ring, cam disk or cam shaft, pump pistons traveling on the filling and supply ramps, and a magnet valve controlling the injection pump and having a closure defining a supply onset. An apparatus for ascertaining at least one actual operating state of the injection pump includes a structure-borne-sound transducer ascertaining at least one actual operating state.

10 Claims, 1 Drawing Sheet

APPARATUS FOR ASCERTAINING AN OPERATING STATE OF AN INJECTION PUMP

BACKGROUND OF THE INVENTION

1. Field of the Invention

The invention relates to an apparatus for ascertaining at least one actual operating state of a magnet-valve-controlled injection pump for internal combustion engines, in particular Diesel engines, wherein pump pistons travel on a filling ramp and on a supply ramp of a cam ring, cam disk or cam shaft, and a supply onset is defined by a closure of a magnet valve.

In the future, injection pumps with a central electronically controllable valve will be used for high-speed Diesel engines with electronic control of the injection onset and quantity. In them, pistons run on a cam ring or on a cam disk or shaft, which form filling ramps and supply ramps. If the pistons arrive at the supply ramp at a time that simultaneously is supposed to be the supply onset, then if the magnet valve is closed a high pressure immediately builds up, with the consequence thereof being the onset of an injection event.

Published European Application No. 0 481 912 A2 discloses a pump type in which the closing time for the magnet valve does not match the supply onset of the pump. With that type of pump, the cams float between the closing time of the magnet valve and the supply onset time without touching a ramp, until the cams gradually arrive at the supply ramp.

That pump principle (which is also known as the fill-spill mode) is briefly explained below in conjunction with FIG. 3. In that device, the supply onset is not specified by an electronic control unit but rather is arrived at by calculations based on a numerical description of the cam geometry. A certain time elapses between the calculation and the triggering of a magnet valve closing time, in which a supply onset time might have changed and in which case the precise supply onset time is located elsewhere. Inaccuracies in calculation can also result in the actual value of the supply onset time not matching the command value.

That problem is well known. In order to solve the problem, Published European Application No. 0 481 912 A2 proposes a suitable sensor of the kind described in further detail in U.S. Pat. No. 4,884,549. The sensor therein is constructed as a pressure sensor, which is disposed in a line between the pump and an injection nozzle. To that end, the high-pressure line must be opened up in order to place a sensor in it, which involves increased expense for pressure resistance and pressure tightness of the system. If a leak occurs, the system fails.

SUMMARY OF THE INVENTION

It is accordingly an object of the invention to provide an apparatus for ascertaining an operating state of an injection pump, which overcomes the hereinafore-mentioned disadvantages of the heretofore-known devices of this general type and which provides a sensor for ascertaining at least one operating state in a radial piston pump in such way that no intervention into the high-pressure system is required.

With the foregoing and other objects in view there is provided, in accordance with the invention, in an internal combustion engine, in particular a Diesel engine, having an injection pump with a filling ramp and a supply ramp of a cam ring, cam disk or cam shaft, pump pistons traveling on the filling and supply ramps, and a magnet valve controlling the injection pump and having a closure defining a supply onset, an apparatus for ascertaining at least one actual operating state of the injection pump, comprising a structure-borne-sound transducer ascertaining at least one actual operating state.

In accordance with another feature of the invention, an actual operating state is formed by the supply onset upon arrival of one of the pump pistons on the supply ramp.

In accordance with a further feature of the invention, an actual operating state is formed by the supply onset of the pump, wherein a closing time of the magnet valve does not match the supply onset time.

In accordance with an added feature of the invention, an actual operating state is formed by an end of injection.

In accordance with an additional feature of the invention, the structure-borne-sound transducer is a piezoelectric transducer.

In accordance with yet another feature of the invention, the structure-borne-sound transducer is disposed in the vicinity of the cam ring.

In accordance with yet a further feature of the invention, the pump has an rpm transducer, and the structure-borne-sound transducer is disposed in the vicinity of the rpm transducer.

In accordance with yet an added feature of the invention, the pump has a housing, and there is provided an electronic unit disposed on the pump, the structure-borne-sound transducer being disposed on the electronic unit and contacting a part of the pump housing.

In accordance with a concomitant feature of the invention, there is provided a pump control unit in which information of the structure-borne-sound transducer is evaluated.

Particularly when a pump piston arrives on the supply ramp, considerable noise is created because of the sudden high pressure buildup. This noise can be detected, without having to intervene in the actual pressure system, by the provision of a structure-borne-sound transducer according to the invention. Additional pressure lines and the like can therefore be dispensed with, and therefore operating safety is not additionally impaired. The actual supply onset, injection onset and end of injection can thus be ascertained in a simple way with only a single transducer.

As mentioned above, the structure-borne-sound transducer may advantageously be constructed as a piezoelectric transducer. Basically, such a transducer includes a converter element, which may be constructed as a plate, on which a piezoceramic element is disposed. Noise, which for instance is caused by the arrival of a pump piston on the supply ramp, deflects this plate, and as a result an electrical voltage is generated in the piezoceramic, and this voltage is evaluated in an electronic unit.

Other features which are considered as characteristic for the invention are set forth in the appended claims.

Although the invention is illustrated and described herein as embodied in an apparatus for ascertaining an operating state of an injection pump, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 3:
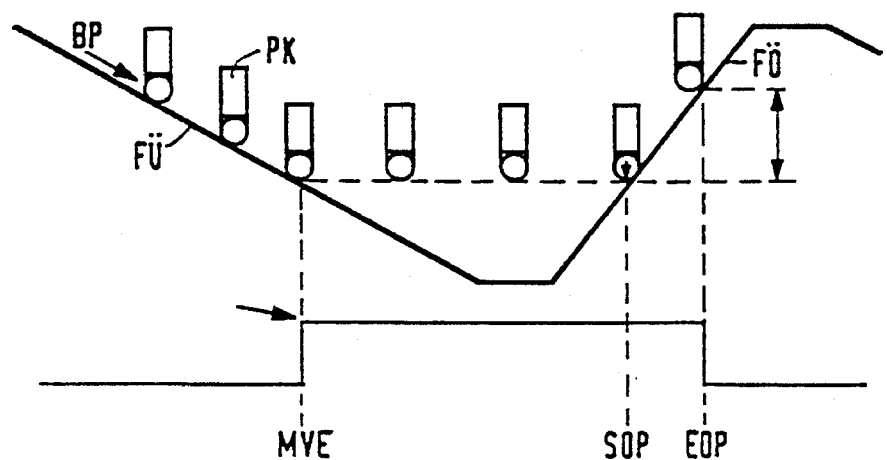
FIG. 3 is a diagram showing the pump principle discussed at the outset.

Referring now to the figures of the drawing in detail and first, particularly, to FIG. 3 thereof, there is seen a pump type disclosed in Published European Application No. 0 481 912 A2, in which a closing time for a magnet valve does not match a supply onset of the pump. With that type of pump, cams float between the closing time of the magnet valve and the supply onset time without touching a ramp, until the cams gradually arrive at the supply ramp.

This pump principle (which is also called the fill-spill mode) will be briefly explained below. The heavy solid line is a developed view of a pump piston path BP over which a pump piston PK travels. A left portion of the heavy solid line forms a fill ramp FÜ, and a right-hand region forms a supply ramp FÖ. A signal for a non-illustrated magnet valve is shown below the path BP. At a time MVE, the magnet valve closes. However, since the pump piston continues to travel, it floats for a certain distance until it arrives at the supply ramp FÖ. Since the magnet valve has already closed by then, this arrival point defines a supply onset time SOP. The pistons then travel along the supply ramp until at a time EOP, which is the end of supply, the magnet valve is opened. The quantity of fuel to be injected is determined by a time difference between SOP and EOP. The remaining fuel from the time EOP up to the maximum value for the pump piston path is returned to the pump volume through the open valve.

In other words, the supply onset is not specified by an electronic control unit but rather is arrived at by calculations based on a numerical description of the cam geometry.

Between the calculation and the triggering of the time MVE, a certain time elapses, in which the supply onset time SOP might have changed, and if so the precise supply onset time is located elsewhere. Inaccuracies in calculation can also mean that the actual value of the supply onset time SOP does not match the command or set point value.

Figure 1:
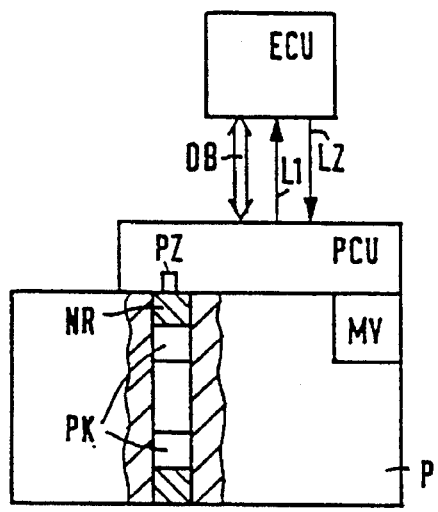
FIG. 1 is a schematic and diagrammatic, partly broken-away, elevational view of a fundamental layout of a trigger system for a pump.

FIG. 1 shows a diagrammatically illustrated pump P, in which non-illustrated drive means drive pump pistons PK. As is suggested in FIG. 3, the pump piston PK travels over a pump piston path BP, which is constructed as a cam ring NR. A control unit PCU for the pump P is disposed directly on the pump P. The control unit PCU is in communication with an engine control unit ECU through a data bus DB and further lines L1, L2, as well as with a magnet valve MV. A piezoelectric transducer PZ is disposed directly on the cam ring NR. The piezoelectric transducer PZ detects the arrival of the pump pistons on the supply ramp FÖ, and the detected information is evaluated in the pump control unit PCU. If the actual value of the supply onset time SOP deviates from the command or set point value, then a suitable correction for the next supply onset can be performed in the pump control unit PCU.

Figure 2:
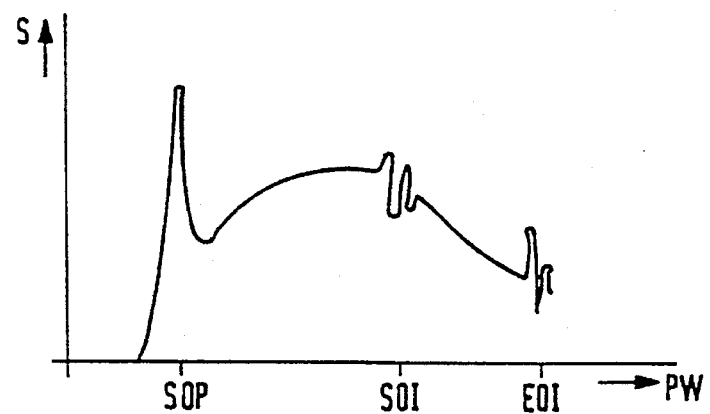
FIG. 2 is a graphic illustration of a typical course of a detected signal.

A graphic illustration of a typical signal course which is ascertained by the structure-borne-sound transducer is shown in FIG. 2. In this case a sound amplitude S is plotted as a function of a pump shaft angle PW, or time. At the supply onset time SOP, a pump piston PK strikes the supply ramp FÖ. This produces a loud noise, which results in a steep, high sound amplitude. Once a certain pressure is reached, a non-illustrated injection nozzle opens. In other words, this is the injection onset SOI. This moment expresses itself in the form of reduced pressure fluctuations, as is suggested in FIG. 2. When the magnet valve MV opens, a further acoustic pressure fluctuation ensues, which is characteristic for the moment of the end of supply EOI. All of these signals may be evaluated in succession in the control unit PCU, so that the exact actual operating states of the times SOP, SOI and EOI are easily ascertainable.

The invention is naturally also applicable to a pump type in which the supply onset time SOP matches the closing time of the magnet valve. In that pump type, a major pressure buildup is caused by the closure of the magnet valve, and that in turn hinders the closing process. Therefore, despite the detection of the valve closing time over the course of the current, that pump type may under some circumstances involve relatively major uncertainty as to the actual supply onset SOP, which can make it appropriate to provide a structure-borne-sound transducer.

I claim:

1. In an internal combustion engine having an injection pump with a filling ramp, a supply ramp, pump pistons traveling on the filling and supply ramps, and a magnet valve controlling the injection pump and having a closure defining a supply onset, an apparatus for ascertaining at least one actual operating state of the injection pump, comprising a structure-borne-sound transducer ascertaining the supply onset upon arrival of one of the pump pistons on the supply ramp as an actual operating state.

2. The apparatus according to claim 1, wherein the filling and supply ramps are part of a cam ring.

3. The apparatus according to claim 1, wherein the filling and supply ramps are part of a cam disk.

4. The apparatus according to claim 1, wherein the filling and supply ramps are part of a cam shaft.

5. The apparatus according to claim 1, wherein a closing time of the magnet valve does not match the supply onset time.

6. The apparatus according to claim 1, wherein said structure-borne-sound transducer is a piezoelectric transducer.

7. The apparatus according to claim 2, wherein said structure-borne-sound transducer is disposed in the vicinity of the cam ring.

8. The apparatus according to claim 1, wherein the pump has an rpm transducer, and said structure-borne-sound transducer is disposed in the vicinity of the rpm transducer.

9. The apparatus according to claim 1, wherein the pump has a housing, and including an electronic unit disposed on the pump, said structure-borne-sound transducer being disposed on said electronic unit and contacting a part of the pump housing.

10. The apparatus according to claim 1, including a pump control unit in which information of said structure-borne-sound transducer is evaluated.

* * * * *